United States Patent
Flender et al.

(10) Patent No.: US 9,004,033 B2
(45) Date of Patent: Apr. 14, 2015

(54) METHOD FOR A SIMPLIFIED AND ACCURATELY POSITIONED FIXING OF A CAMSHAFT MODULE ON A CYLINDER HEAD

(75) Inventors: Thomas Flender, Eberdingen (DE); Stefan Steichele, Gerlingen (DE); Falk Schneider, Korntal-Muenchingen (DE); Antonio Menonna, Ditzingen (DE)

(73) Assignee: Mahle International GmbH (DE)

( * ) Notice: Subject to any disclaimer, the term of this patent is extended or adjusted under 35 U.S.C. 154(b) by 68 days.

(21) Appl. No.: 13/593,501

(22) Filed: Aug. 23, 2012

(65) Prior Publication Data

US 2013/0055981 A1 Mar. 7, 2013

(30) Foreign Application Priority Data

Aug. 24, 2011 (DE) .......................... 10 2011 081 483

(51) Int. Cl.
*F01L 1/04* (2006.01)
*F01L 1/047* (2006.01)
*F16C 35/04* (2006.01)
*F01M 9/10* (2006.01)
*F01M 1/06* (2006.01)

(52) U.S. Cl.
CPC ................ *F01L 1/047* (2013.01); *F01M 9/102* (2013.01); *F01M 2001/064* (2013.01); *F01L 2001/0476* (2013.01); *F16C 35/047* (2013.01)

(58) Field of Classification Search
CPC F01L 1/047; F01L 2001/0476; F16C 35/047; F16C 35/06; F01M 9/102; F01M 2001/064

USPC ........... 123/90.6, 193.5, 193.3, 90.15, 90.17; 29/888.1
See application file for complete search history.

(56) References Cited

U.S. PATENT DOCUMENTS

| 6,223,709 B1 | 5/2001 | Takahashi |
| 8,231,278 B1 * | 7/2012 | Carruth et al. ................ 384/294 |
| 2009/0133528 A1 | 5/2009 | Waseda |
| 2009/0165737 A1 | 7/2009 | Kreisig et al. |

FOREIGN PATENT DOCUMENTS

| DE | 3641129 C | * | 7/1987 |
| DE | 19944013 A1 | | 3/2000 |
| DE | 202006018359 U1 | | 2/2007 |
| DE | 102007063255 A1 | | 7/2009 |
| DE | 102010019280 A1 | | 11/2011 |

(Continued)

OTHER PUBLICATIONS

English abstract for DE-2006018359, Aug. 23, 2012.

(Continued)

*Primary Examiner* — Ching Chang
(74) *Attorney, Agent, or Firm* — Rader, Fishman & Grauer PLLC

(57) ABSTRACT

The invention relates to a method for the simplified and accurately positioned fixing of a camshaft module with a camshaft and bearing blocks on a cylinder head. The bearing blocks, aligned in axial direction and with respect to an angle, may be fastened on the camshaft. The camshaft may be aligned via two alignment elements with respect to the cylinder head. Further, the individual bearing blocks may be screwed tightly with the cylinder head with simultaneous or interim rotation of the camshaft.

16 Claims, 2 Drawing Sheets

(56) References Cited

FOREIGN PATENT DOCUMENTS

EP   1956222 A1     8/2008
FR   2815092 A1  *  4/2002

OTHER PUBLICATIONS

English abstract for DE-102010019280, Nov. 10, 2001.
English abstract for EP-1956222, Aug. 13, 2008.

* cited by examiner

METHOD FOR A SIMPLIFIED AND ACCURATELY POSITIONED FIXING OF A CAMSHAFT MODULE ON A CYLINDER HEAD

CROSS-REFERENCE TO RELATED APPLICATION

This application claims priority to German Patent Application No. 10 2011 081 483.3 filed on Aug. 24, 2011, the contents of which are hereby incorporated by reference in their entirety.

TECHNICAL FIELD

The present invention relates to a method for the simplified and accurately positioned fixing of a camshaft module with a camshaft and bearing blocks on a cylinder head. The invention furthermore relates to an internal combustion engine with a cylinder crankcase and with such a camshaft module to carry out the method.

BACKGROUND

Camshafts are required in internal combustion engines for controlling the inlet and outlet valves and are fastened via so-called bearing blocks to a cylinder head in the cylinder crankcase of the internal combustion engine. In order to be able to achieve as smooth a bearing of the camshaft as possible, it is necessary that the camshaft and the bearing blocks are aligned exactly with respect to the cylinder head. However, this presents not insignificant problems for modern manufacture, in which prefabricated camshaft modules are increasingly required by the suppliers, i.e. camshaft modules with a camshaft and already mounted bearing blocks, and are to be delivered to the site of final installation, because in particular the aligning of such a prefabricated camshaft with respect to the cylinder head presents considerable difficulties.

SUMMARY

The present invention is therefore concerned with the problem of indicating a method for the simplified and accurately positioned fixing of a camshaft module with a camshaft and bearing blocks bearing the latter on a cylinder head.

This problem is solved according to the invention by the subject matter of the independent claims. Advantageous embodiments are the subject matter of the dependent claims.

The present invention is based on the general idea of providing a camshaft module, which comprises a camshaft and bearing blocks bearing the latter, with two alignment elements, which are able to be brought into engagement with two alignment elements arranged on a cylinder head and constructed in a complementary manner thereto, so that the camshaft module and hence also the camshaft itself can be arranged in an exactly predefined and aligned position in a comparatively simple manner on the cylinder head and can then be fixed. Firstly, in the method according to the invention, the bearing blocks, aligned in axial direction and with respect to an angle, are fastened on the camshaft. Hereby, already a smooth bearing of the camshaft in the bearing blocks is ensured. Two of these bearing blocks have here respectively at least one alignment element, which on arranging of the camshaft module according to the invention on the cylinder head cooperate with at least two alignment elements arranged on the cylinder head and constructed in a complementary manner thereto, whereby a statically determined arrangement of the camshaft on the cylinder head is achieved. When the camshaft, aligned in such a manner, is arranged on the cylinder head, the individual bearing blocks are screwed securely with the cylinder head with simultaneous or interim rotation of the camshaft. The rotating of the camshaft enables an equalization of manufacturing tolerances without, in so doing, influencing the actual alignment of the camshaft relative to the cylinder head. By the method according to the invention, it is therefore possible for a supplier to already provide camshaft modules which are already pre-aligned with respect to the bearing blocks and the camshaft, are smooth and hence optimally adjusted, which can then be aligned with respect to the cylinder head by means of the alignment elements arranged on the bearing blocks and on the cylinder head and which can be fixed to the cylinder head in this aligned position in a simple manner, for example by means of screwing tightly. By the method according to the invention, in particular hitherto laborious alignment processes can be dispensed with.

The invention further relates to the general idea of providing alignment elements in an internal combustion engine, i.e. in particular on a cylinder head thereof and on a prefabricated camshaft module described in the previous paragraph, wherein on two bearing blocks of the camshaft module respectively at least one alignment element is provided, which cooperate with alignment elements, constructed in a complementary manner thereto, on the cylinder head, and enable a statically determined alignment of the camshaft relative to the cylinder head in accordance with the method described in the previous paragraph. To carry out the method according to the invention, therefore in addition to the camshaft module having the alignment elements, a cylinder head with such alignment elements is also necessary. The alignment elements can, for example be constructed as fitting sleeves which engage into corresponding fitting bores on the cylinder head and/or on the bearing block. One of the fitting bores on the cylinder head or on the bearing block is constructed here as an elongated hole extending in axial direction of the camshaft, in order to enable the statically determined arrangement of the camshaft module on the cylinder head. In particular tolerances related to manufacture are to be able to be equalized hereby, which would not be possible without the fitting bore constructed as an elongated hole, and would thereby necessarily lead to a static overdetermination. As an alternative to the fitting sleeves or respectively fitting bores, the alignment elements can of course also be constructed as a tongue and groove or respectively as corresponding guide surfaces or respectively guide grooves or guide contours, wherein at least one of these tongue-and-groove connections is to be constructed as a displaceable connection in the axial direction of the camshaft, in order to be able to compensate the above-mentioned manufacturing tolerances and in particular in order to be able to avoid a static overdetermination and tensions resulting therefrom.

In an advantageous further development of the solution according to the invention, the alignment elements are arranged respectively on the outermost bearing blocks. Through the arrangement of the alignment elements on the outermost bearing blocks, a particularly exact alignment of the camshaft module is possible, and hence also of the camshaft itself relative to the cylinder head.

Further important features and advantages of the invention will emerge from the subclaims, from the drawings and from the associated description of the figures with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
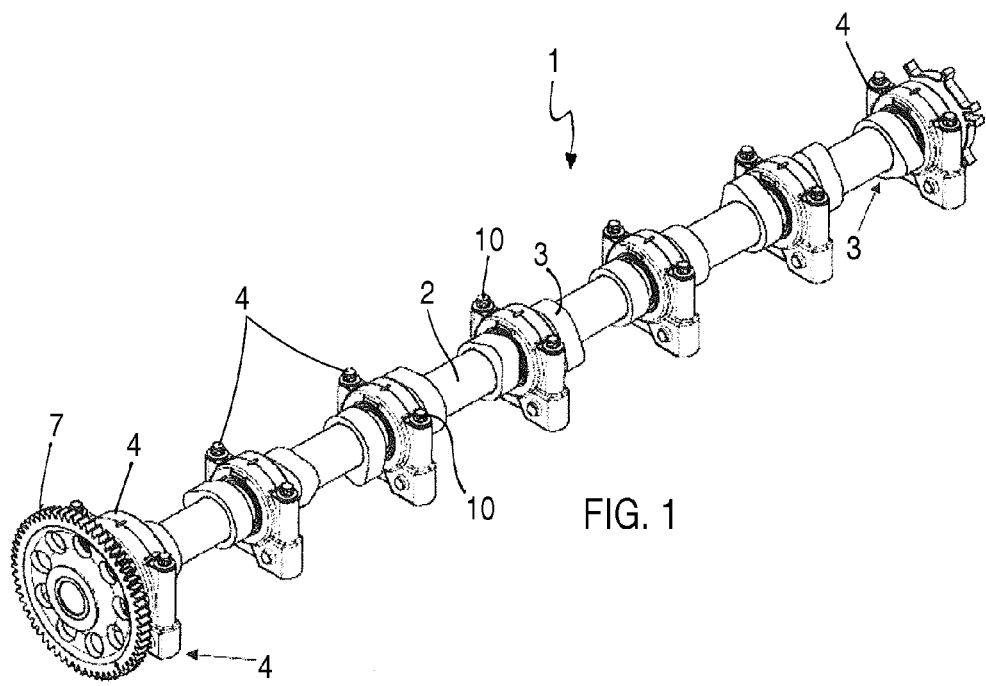
FIG. 1 a camshaft module, according to the invention, of a camshaft and a total of seven bearing blocks bearing the latter, FIG. 2 a sectional illustration through a first possible embodiment of a bearing block according to the invention and of an associated cylinder head with a first embodiment of an alignment element, FIG. 3 an illustration as in FIG. 2, but in a second possible embodiment of the alignment element.

In accordance with FIG. 1, a camshaft module 1 has a camshaft 2 with cams 3 arranged in a torque-proof manner thereon, which serve in a usual and known manner for the controlling of inlet and outlet valves, which are not shown, on an internal combustion engine. The camshaft 2 is mounted via bearing blocks 4 and is fixed via the latter to a cylinder head 5 (cf. FIGS. 2 and 3). According to FIG. 1, the camshaft 2 is mounted here via a total of seven bearing blocks 4. According to the invention, two of the bearing blocks 4 now have respectively at least one alignment element 6, cooperate with alignment elements 6' on the cylinder head 5, constructed in a complementary manner thereto, and enable a statically determined, i.e. unconstrained, alignment of the camshaft 2 to the cylinder head 5. The bearing blocks 4 having the alignment elements 6 are preferably the outermost bearing blocks 4 here, i.e. according to FIG. 1 the bearing block 4 which is arranged directly adjacent to a drive element 7, in particular a chain wheel, and the bearing block 4 which is arranged furthest distant from the drive element 7, in particular from the chain wheel.

Figure 2:
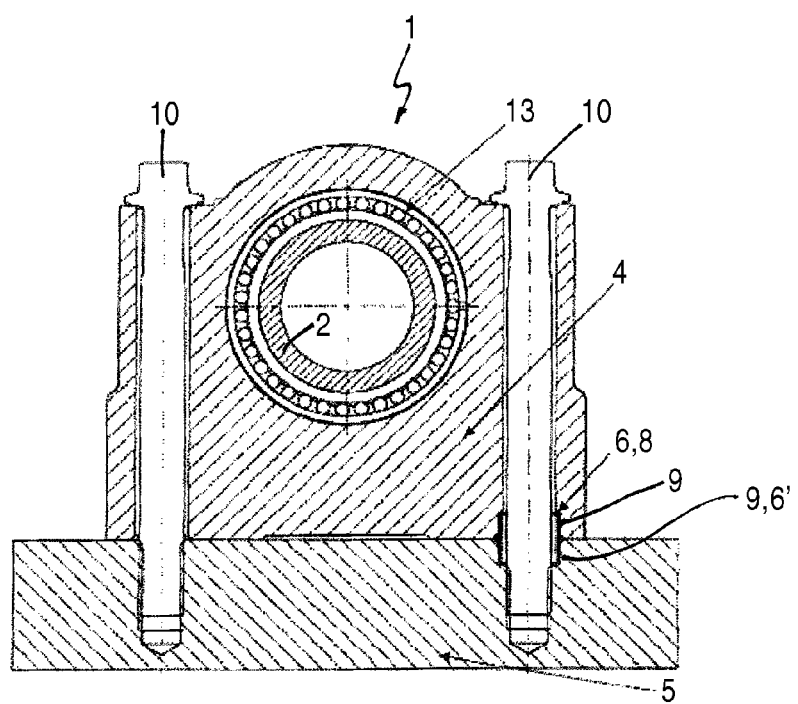
Figure 3:
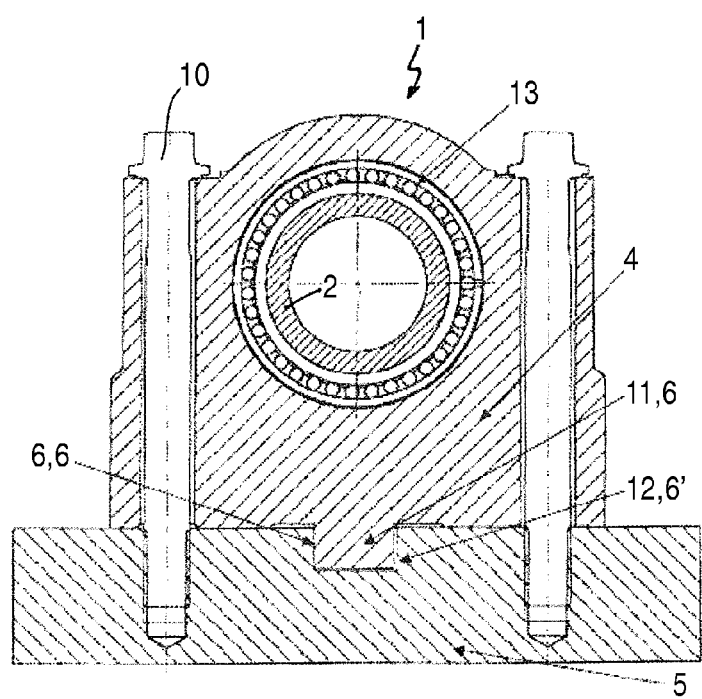

The alignment element 6 can be constructed for example as a fitting sleeve 8 (cf. FIG. 2), which engages into corresponding fitting bores 9 on the cylinder head 5 and/or on the associated bearing block 4. The fitting sleeve 8 can be penetrated here by a fastening screw 10. One of the fitting bores 9 on the cylinder head 5 or on the bearing block 4 is constructed here as an elongated hole extending in axial direction of the camshaft 2 and thereby enables a compensation of manufacturing tolerances which possibly occur and, at the same time, an avoidance of constraint stresses. As an alternative to this, the alignment element 6 can also be constructed as a tongue 11 (cf. FIG. 3), which engages into a corresponding groove 12. The tongue 11 can be arranged here either on the bearing block 4 or on the cylinder head 5, wherein then the groove 12 or respectively the tongue 11 is arranged on the opposite component, i.e. on the cylinder head 5 or respectively on the bearing block 4. FIG. 3 shows here the construction of the alignment elements 6, 6' as groove 11 and tongue 12, wherein the groove 12 extends in the axial direction of the camshaft 2, i.e. perpendicularly to the plane of the drawing, and thereby enables the statically determined arrangement of the camshaft module 1 on the cylinder head 5.

Generally, the bearing blocks 4 can have integrated roller bearings 13, for example ball or needle bearings, for the bearing of the camshaft 2. The integrated roller bearing 13 can have here either an outer ring pressed with the associated bearing block 4 and an inner ring pressed with the camshaft 2, between which rolling bodies roll, or else the integrated roller bearing 13 has an outer ring pressed with the associated bearing block 4 and rolling bodies rolling directly on the camshaft 2. In FIGS. 2 and 3, the first of the two alternatives is drawn here. In the case of integrated roller bearings 13 with an inner ring, the bearing blocks 4 are axially pre-positioned by means of a press fit between the bearing block housing and outer ring, and by means of a press fit between the inner ring and camshaft 2 on the camshaft 2. A pre-positioning which is correct with regard to angular position is to be ensured here before mounting on the cylinder head 5. Subsequently, the camshaft 2, i.e. the camshaft module 1, can be aligned via the alignment elements 6 with the alignment elements 6' on the cylinder head 5, and can be fixed on the latter.

Of course, it is also conceivable that the camshaft 2 is mounted via sliding bearings with respect to the bearing blocks 4. In the case of bearing blocks 4 with integrated roller bearings 13 without an inner ring, and in the case of bearing blocks without roller bearing, i.e. with a sliding bearing, the bearing blocks must likewise be pre-positioned axially and in the correct angular position with respect to the camshaft 2. This can be realized for example by a suitable transportation packing in the manner of a negative matrix, by a clipped plastic device, which is removed after or respectively during mounting on the cylinder head 5 (ridge/rack) or by a further motor element, such as for example a plastic cylinder head cover with suitable possibility for clipping. Subsequently also a camshaft module 1 which has been pre-aligned in such a manner is aligned by means of the alignment elements 6, 6' in the correct position with respect to the cylinder head 5 and is fixed on the cylinder head 5 via corresponding fastening screws 10. In so doing, of course a fixing, i.e. a pretensioning of the bearing blocks 4 or respectively of the camshaft 2 with respect to the cylinder head 5 can take place during the tightening of the fastening screws 10, for example by a bracketing.

The camshaft module 1 according to the invention also enables a comparatively simple and nevertheless accurately positioned fixing of the camshaft 2 on the cylinder head 5, wherein firstly the bearing blocks 4 are fastened, aligned in axial direction and with respect to an angle, on the camshaft 2. Subsequently, the camshaft 2 is aligned with respect to the cylinder head 5 via at least two alignment elements 6, 6', wherein the two pairs of alignment elements 6, 6' are arranged on two—preferably on the outermost—bearing blocks 4. The individual bearing blocks 4 are then screwed securely to the cylinder block 5 with simultaneous or interim rotation of the camshaft 2, in order to be able to monitor its free movement continuously. Here, of course, the camshaft 2 and/or at least individual bearing blocks 4 or on screwing tightly can be tensioned against the cylinder head 5, whereby an unintentional turning of the bearing blocks 4 on screwing tightly can be additionally at least made difficult.

With the alignment elements 6, 6' according to the invention a simple and, at the same time accurately positioned aligning of the camshaft module 1 with respect to the cylinder head 5 and hence a comparatively simple mounting of the camshaft 2 on the cylinder head 5 is possible. At the same time, with the camshaft module 1 according to the invention, a smooth bearing of the camshaft 2 can be guaranteed.

The invention claimed is:
1. A method for the simplified and accurately positioned fixing of a camshaft module with a camshaft and bearing blocks on a cylinder head comprising:

aligning the bearing blocks, in an axial direction of the camshaft and with respect to an angle;

fastening the bearing blocks on the camshaft;

aligning the camshaft via two alignment elements with respect to the cylinder head, wherein at least one alignment element includes an elongated void extending in the axial direction of the camshaft disposed on at least one of the bearing block and the cylinder head, which receives a corresponding alignment element disposed on the other of the bearing block and the cylinder head to align the bearing block relative to the cylinder head, wherein one alignment element is a fitting sleeve, which engages into a corresponding fitting bore on at least one of the cylinder head and the bearing block, the fitting bore including the elongated void extending in the axial direction of the camshaft; and screwing the individual bearing blocks tightly with the cylinder head with at least one of simultaneous and interim rotation of the camshaft.

2. The method according to claim 1, further comprising tensioning at least one of the camshaft and at least individual bearing blocks before and during screwing.

3. An internal combustion engine with a cylinder crankcase having a cylinder head and with a camshaft module, comprising: a camshaft and bearing blocks mounting the camshaft wherein two bearing blocks respectively have at least one alignment element, which cooperate with alignment elements, constructed in a complementary manner thereto, on the cylinder head and enable a statically determined aligning of the camshaft to the cylinder head, wherein there are two alignment elements, a first alignment element on at least one of the bearing block and the cylinder head including an elongated void extending in an axial direction of the camshaft which receives a corresponding alignment element on the other of the bearing block and the cylinder head, wherein one alignment element is a fitting sleeve, which engages into a corresponding fitting bore on at least one of the cylinder head and the bearing block, the fitting bore including the elongated void extending in the axial direction of the camshaft.

4. The internal combustion engine according to claim 3, wherein the alignment elements are constructed as a groove and tongue.

5. The internal combustion engine according to claim 3, wherein the alignment elements are arranged on the outermost bearing blocks.

6. The internal combustion engine according to claim 3, wherein the bearing blocks have integrated roller bearings for bearing the camshaft.

7. The internal combustion engine according to claim 6, wherein
the integrated roller bearing has an outer ring pressed with the associated bearing block and an inner ring pressed with the camshaft, between which rolling bodies roll, or
the integrated roller bearing has an outer ring pressed with the associated bearing block and has rolling bodies rolling directly on the camshaft.

8. The internal combustion engine according to claim 3, wherein the camshaft is mounted via sliding bearings with respect to the bearing blocks.

9. An internal combustion engine with simplified and accurately positioned fixing of a camshaft module with a camshaft and bearing blocks on a cylinder head comprising:
the bearing blocks being aligned in an axial direction of the camshaft and with respect to an angle;
the bearing blocks secured on the camshaft;
the camshaft being aligned via two alignment elements with respect to the cylinder head, wherein at least one alignment element disposed on at least one of the bearing block and the cylinder head engages into a corresponding alignment element extending in the axial direction of the camshaft disposed on the other of the bearing block and the cylinder head, wherein one alignment element is a fitting sleeve, which engages into a corresponding fitting bore on at least one of the cylinder head and the bearing block, the fitting bore including the elongated void extending in the axial direction of the camshaft; and
the individual bearing blocks screwed tightly with the cylinder head with at least one of simultaneous and interim rotation of the camshaft.

10. The internal combustion engine according to claim 9, wherein at least one of the camshaft and at least individual bearing blocks are tensioned before and during being screwed tightly against the cylinder head.

11. An internal combustion engine according to claim 10, wherein two bearing blocks respectively have at least one alignment element, which cooperate with alignment elements, constructed in a complementary manner thereto, on the cylinder head and enable a statically determined aligning of the camshaft to the cylinder head.

12. An internal combustion engine according to claim 9, wherein two bearing blocks respectively have at least one alignment element, which cooperate with alignment elements, constructed in a complementary manner thereto, on the cylinder head and enable a statically determined aligning of the camshaft to the cylinder head.

13. The internal combustion engine according to claim 12, wherein the alignment elements are constructed as a groove and tongue.

14. The internal combustion engine according to claim 12, wherein the alignment elements are arranged on the outermost bearing blocks.

15. The internal combustion engine according to claim 12, wherein the bearing blocks have integrated roller bearings for bearing the camshaft.

16. The internal combustion engine according to claim 15, wherein
the integrated roller bearing has an outer ring pressed with the associated bearing block and an inner ring pressed with the camshaft, between which rolling bodies roll, or
the integrated roller bearing has an outer ring pressed with the associated bearing block and has rolling bodies rolling directly on the camshaft.

* * * * *